(12) United States Patent
Yamakawa (10) Patent No.: US 7,184,243 B2
(45) Date of Patent: Feb. 27, 2007

(54) CARTRIDGE LOADING MECHANISM

(75) Inventor: Kengo Yamakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 81 days.

(21) Appl. No.: 11/111,937

(22) Filed: Apr. 22, 2005

(65) Prior Publication Data
US 2005/0190487 A1 Sep. 1, 2005

Related U.S. Application Data

(63) Continuation of application No. PCT/JP03/005959, filed on May 13, 2003.

(51) Int. Cl.
*G11B 15/675* (2006.01)
(52) U.S. Cl. .................................. 360/96.5
(58) Field of Classification Search ............. None
See application file for complete search history.

(56) References Cited

U.S. PATENT DOCUMENTS 5,883,754 A * 3/1999 Kobayashi ............. 360/96.5

FOREIGN PATENT DOCUMENTS

| JP | 6-89489 | 3/1994 |
| JP | 7-6461 | 1/1995 |
| JP | 11-144355 | 5/1999 |

* cited by examiner

*Primary Examiner*—Robert S. Tupper
(74) *Attorney, Agent, or Firm*—Westerman, Hattori, Daniels & Adrian, LLP.

(57) ABSTRACT

A cartridge loading mechanism including a carrier movable between a first position where a magnetic tape cartridge having an openable shutter and a notch is inserted into the carrier and a second position where the cartridge is mounted onto a reel motor, and a shutter opening mechanism fixed to a base of a magnetic tape drive and having an engaging portion adapted to engage the shutter of the cartridge to open the shutter. The loading mechanism further includes a leaf spring mounted on the carrier and having a hook adapted to engage the notch of the cartridge, and a driving mechanism for moving the carrier between the first position and the second position. After the hook of the leaf spring comes into engagement with the notch of the cartridge at a third position during the movement of the carrier from the first position to the second position, the engaging portion of the shutter opening mechanism starts to engage the shutter of the cartridge.

5 Claims, 12 Drawing Sheets

CARTRIDGE LOADING MECHANISM

This is a continuation of PCT International Application NO. PCT/JP03/005959, filed May 13, 2003, which was not published in English.

BACKGROUND OF THE INVENTION

1. Field of the Invention

The present invention relates generally to an autoloading mechanism for a magnetic tape drive using a magnetic tape cartridge, and more particularly to an autoloading mechanism for a magnetic tape drive using an LTO (Linear Tape Open) medium.

2. Description of the Related Art

At present, a magnetic disk drive, optical disk drive, magnetic tape drive, etc. are used as an external storage device for a computer. A disk drive such as a magnetic disk drive and an optical disk drive can provide easy access to desired data, so that the research and development for such a disk drive are increasingly conducted and technological innovation on increasing a storage capacity, for example, is remarkable. On the other hand, a magnetic tape drive may have a disadvantage such that much time is required for the access to desired data in some case. However, the magnetic tape drive is suitable for the storage of large-capacity data, so that it is actively used as a backup storage for the data already stored in a disk drive.

A conventional loading mechanism for a magnetic tape drive includes a carrier for moving a magnetic tape cartridge (which will be hereinafter referred to simply as a cartridge) loaded into the magnetic tape drive to a mounting position where the cartridge is mounted onto a reel motor and for mounting the cartridge onto the reel motor, and further includes a shutter opening mechanism for opening a shutter normally closing a tape drawing window of the cartridge. The shutter opening mechanism is integral with the carrier.

When the cartridge is inserted into the carrier in this conventional loading mechanism, the shutter of the cartridge abuts against the shutter opening mechanism. When the cartridge is further inserted into the carrier, the shutter starts to be opened and a hook normally biased in a direction projecting inward of the carrier is urged outward of the carrier by the cartridge. When the shutter is opened by a required amount, the cartridge abuts against a stopper (rear wall) of the carrier. At the same time, a notch of the cartridge comes to a position corresponding to the hook, so that the hook is brought into resilient engagement with the notch of the cartridge. Although the cartridge is urged in its ejecting direction by the reaction force of the shutter, the cartridge is held in the carrier because the hook is engaged with the notch.

The conventional loading mechanism mentioned above has the following problems.

(1) In inserting the cartridge into the carrier, the reaction force of the shutter is generated. Accordingly, an operator (or a handling robot in a library unit) is required to generate a cartridge inserting force greater than the reaction force of the shutter.

(2) In inserting the cartridge into the carrier, the reaction force of the hook is generated. Accordingly, the operator is required to generate a cartridge inserting force greater than the reaction force of the hook.

(3) Also in ejecting the cartridge from the carrier, the reaction force of the hook is generated. Accordingly, the operator is required to generate a cartridge ejecting force greater than the reaction force of the hook.

(4) The cartridge always comes into strong sliding contact with the hook, so that a sliding contact portion of the cartridge to the hook is worn. Accordingly, the surface condition of this sliding contact portion of the cartridge is deteriorated or wear particles are generated from the cartridge. As a result, there is a possibility that the sliding friction between the hook and the cartridge may be increased during the cartridge inserting operation by the operator and that the cartridge cannot be normally inserted into the carrier.

(5) Also during the cartridge ejecting (removing) operation by the operator, the sliding friction between the hook and the cartridge may be increased to cause a problem that the cartridge cannot be ejected from the carrier.

SUMMARY OF THE INVENTION

It is therefore an object of the present invention to provide a cartridge loading mechanism improved in operability and reliability.

In accordance with an aspect of the present invention, there is provided a cartridge loading mechanism including a carrier movable between a first position where a cartridge having an openable lid and an engaged portion is inserted into the carrier and a second position where the cartridge is mounted onto a reel motor; a lid opening mechanism fixed to a base and having a first engaging portion adapted to engage the lid of the cartridge to open the lid; a leaf spring mounted on the carrier and having a second engaging portion adapted to engage the engaged portion of the cartridge; and a driving mechanism for moving the carrier between the first position and the second position; after the second engaging portion of the leaf spring coming into engagement with the engaged portion of the cartridge at a third position during the movement of the carrier from the first position to the second position, the first engaging portion of the lid opening mechanism starting to engage the lid of the cartridge.

The lid is opened by the movement of the carrier toward the second position in the condition where the first opening portion of the lid opening mechanism is engaged with the lid. In a cartridge ejecting operation where the carrier is moved from the second position to the first position, the second engaging portion of the leaf spring is disengaged from the engaged portion of the cartridge after the first engaging portion of the lid opening mechanism is completely separated from the lid.

Preferably, the lid opening mechanism is formed from a plate member fixed to the base, and the second engaging portion of the leaf spring is biased in a direction moving away from the carrier. Preferably, the plate member has a pressing portion for pressing the leaf spring at a position opposite to the first engaging portion, whereby when the carrier is moved from the first position toward the second position, the leaf spring is pressed by the pressing portion in a direction moving toward the carrier to bring the second engaging portion of the leaf spring into resilient engagement with the engaged portion of the cartridge.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
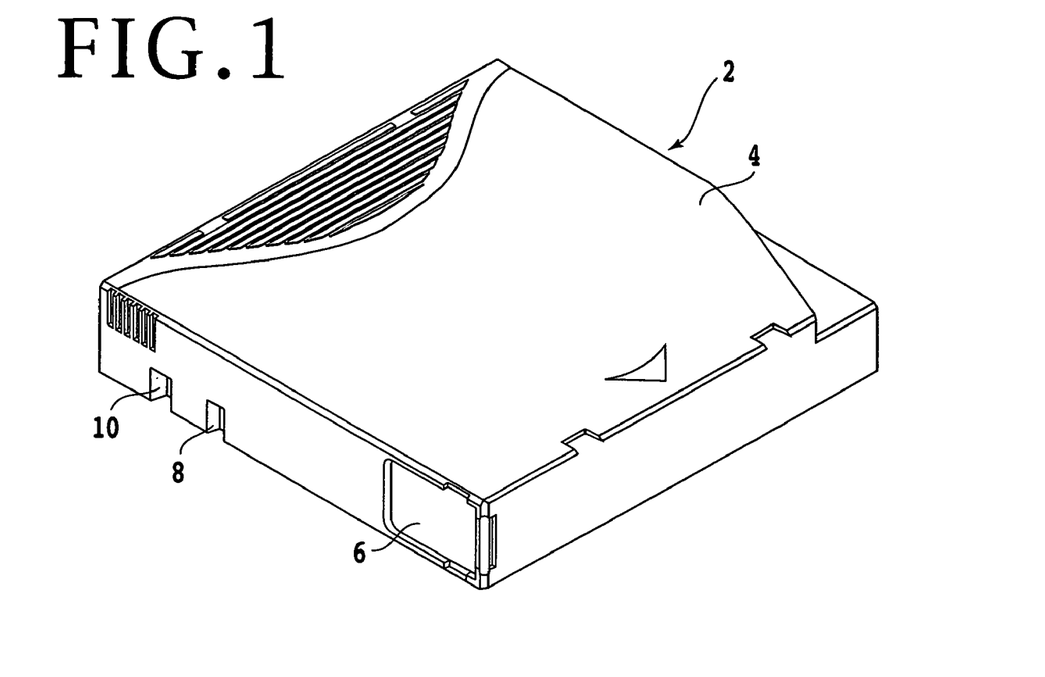
FIG. 1 is a perspective view of a magnetic tape cartridge as viewed from the upper side thereof.
Figure 2:
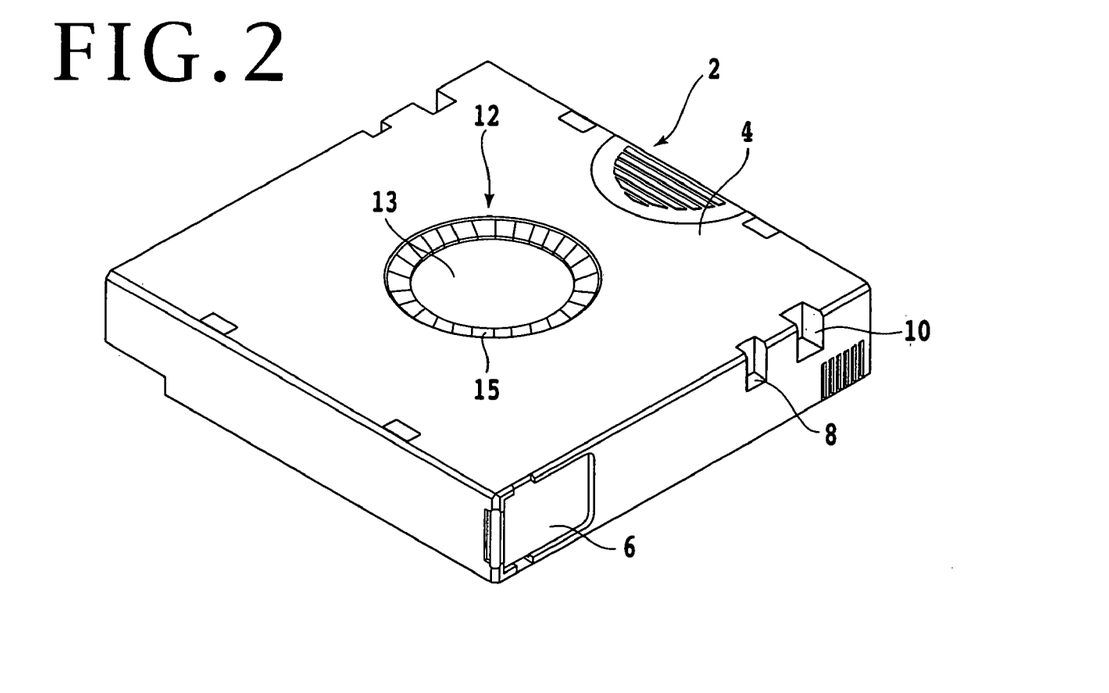
FIG. 2 is another perspective view of the magnetic tape cartridge, showing the lower side thereof.

Referring to FIG. 1, there is shown a perspective view of an LTO type magnetic tape cartridge 2. FIG. 2 is another perspective view of the magnetic tape cartridge 2, showing the lower side thereof. The magnetic tape cartridge 2 has a cartridge casing 4 accommodating a magnetic tape wound around a cartridge reel. The magnetic tape cartridge 2 has one side surface formed at its front end with a shutter (lid) 6 normally biased in its closing direction. This one side surface of the magnetic tape cartridge 2 is further formed with two notches 8 and 10 exposed to the lower surface of the magnetic tape cartridge 2. As shown in FIG. 2, the magnetic tape cartridge 2 has a chucking mechanism 12 composed of a magnetic member 13 such as an iron member and an annular gear 15. The chucking mechanism 12 is connected to the cartridge reel accommodated in the cartridge casing 4.

Figure 3:
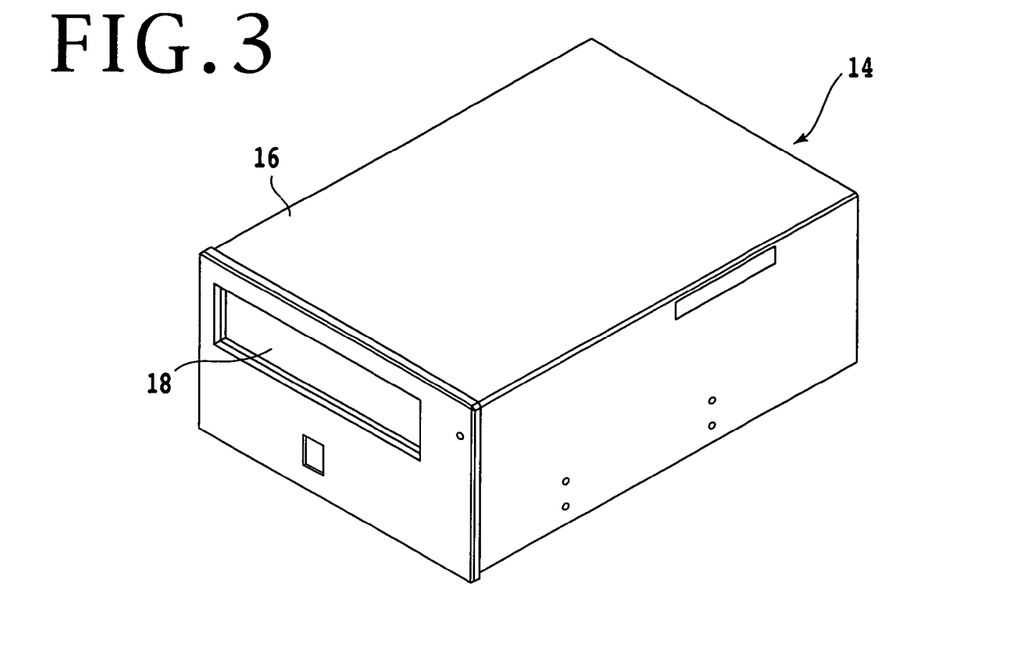
FIG. 3 is a perspective view of a magnetic tape drive, showing the external appearance thereof.
Figure 4:
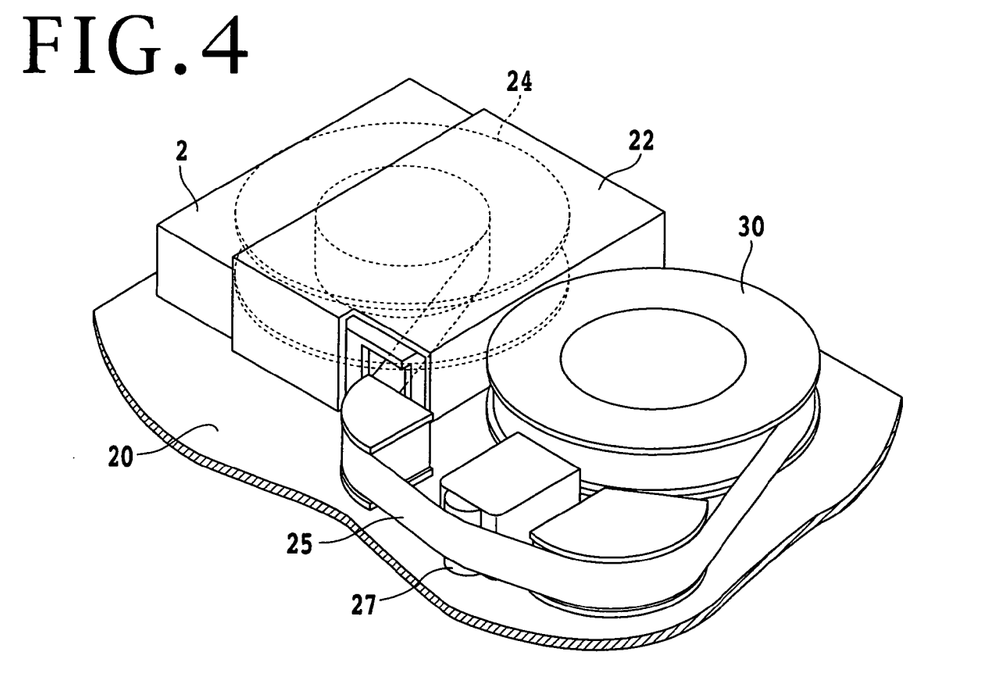
FIG. 4 is a perspective view schematically showing the internal configuration of the magnetic tape drive.
Figure 5:
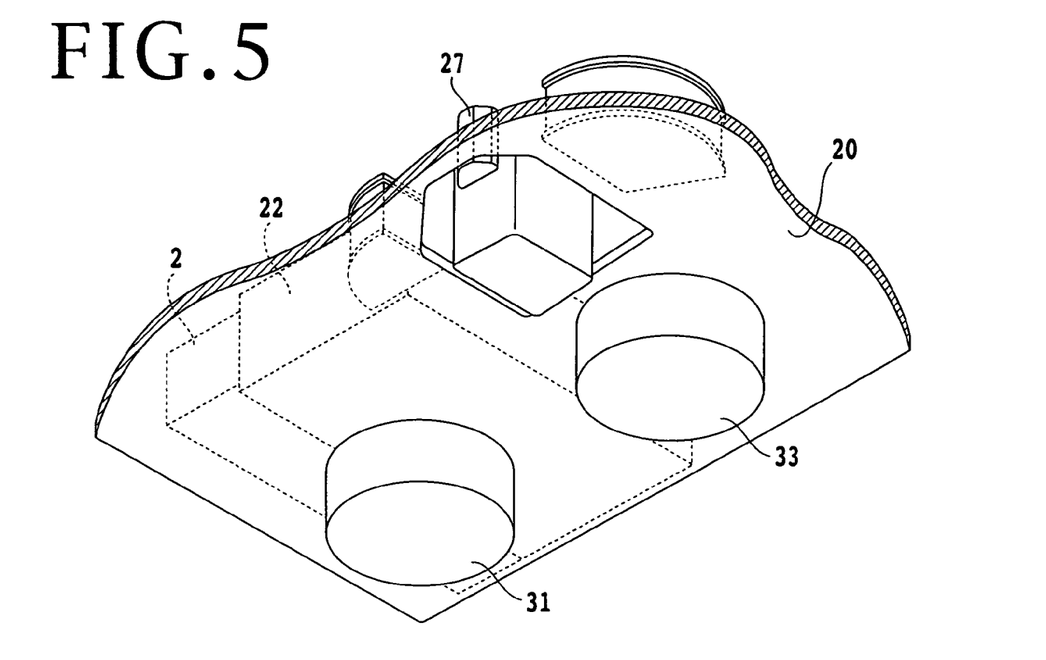
FIG. 5 is another perspective view of the internal configuration shown in FIG. 4 as viewed from the lower side thereof.

FIG. 3 is a perspective view of a magnetic tape drive 14, showing the external appearance thereof, and FIG. 4 is a perspective view schematically showing the internal configuration of the magnetic tape drive 14. FIG. 5 is another perspective view of the internal configuration shown in FIG. 4 as viewed from the lower side thereof. As shown in FIG. 3, the magnetic tape drive 14 has a housing 16 whose front end surface is formed with a cartridge loading slot (insertion slot) 18. Referring to FIGS. 4 and 5, a supply reel motor 31, a take-up reel motor 33, and a magnetic head 27 for recording and reproducing data are mounted on a base 20 provided in the tape drive 14.

As shown in FIGS. 4 and 5, the magnetic tape cartridge 2 is adapted to be inserted into a carrier 22 movably provided in the tape drive 14. A magnetic tape 25 is adapted to be supplied from a cartridge reel 24 provided in the magnetic tape cartridge 2, next moving past the magnetic head 27, and then being taken up by a take-up reel 30 provided in the tape drive 14. The condition shown in FIGS. 4 and 5 is a condition where the carrier 22 holding the magnetic tape cartridge 2 has been moved to a cartridge mounting position and the chucking mechanism 12 connected to the cartridge reel 24 in the magnetic tape cartridge 2 is chucked (engaged) to a chucking mechanism of the supply reel motor 31 in the tape drive 14. The take-up reel 30 is rotated by the take-up reel motor 33.

Figure 6:
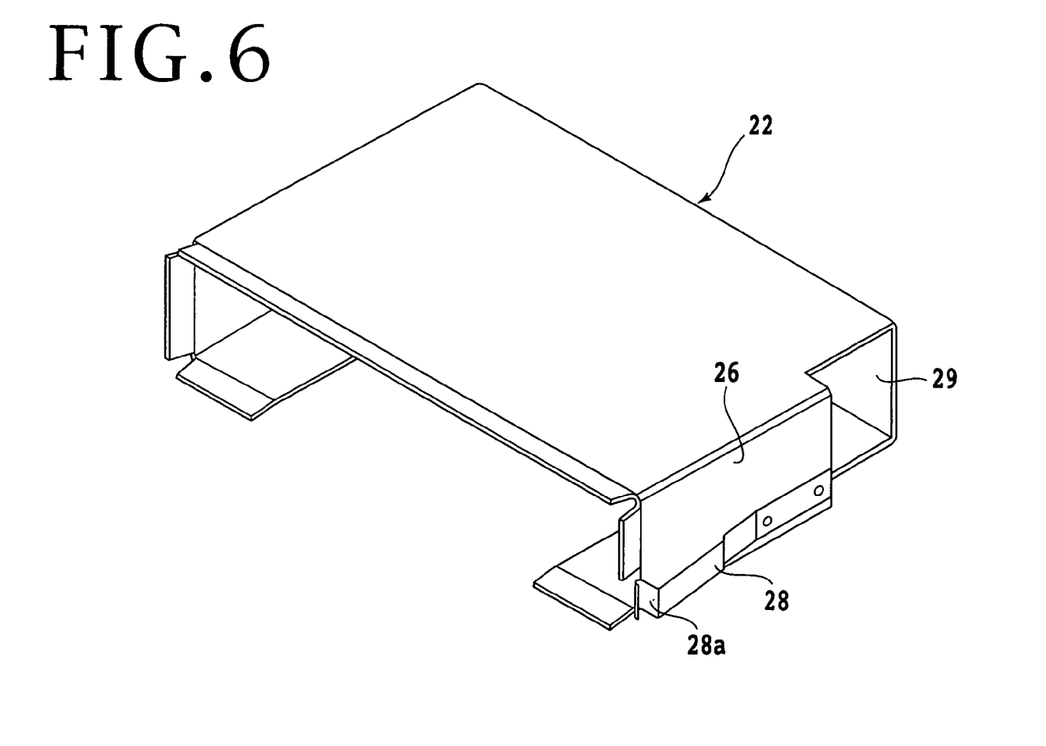
FIG. 6 is a perspective view of a carrier according to the present invention.
Figure 7A:
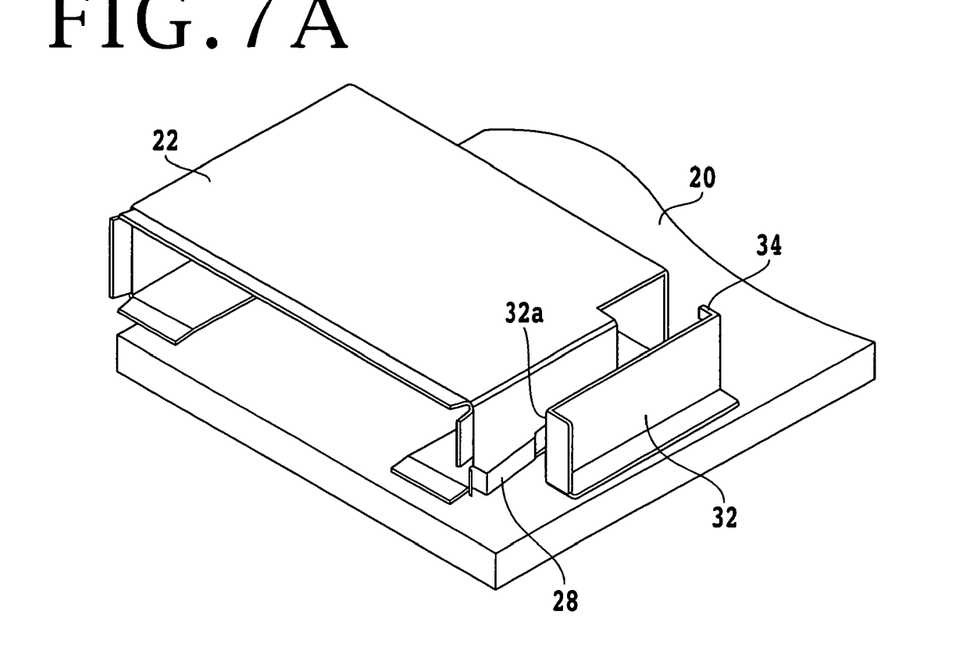
FIG. 7A is a perspective view showing a loading mechanism according to the present invention as viewed from the front side thereof.
Figure 7B:
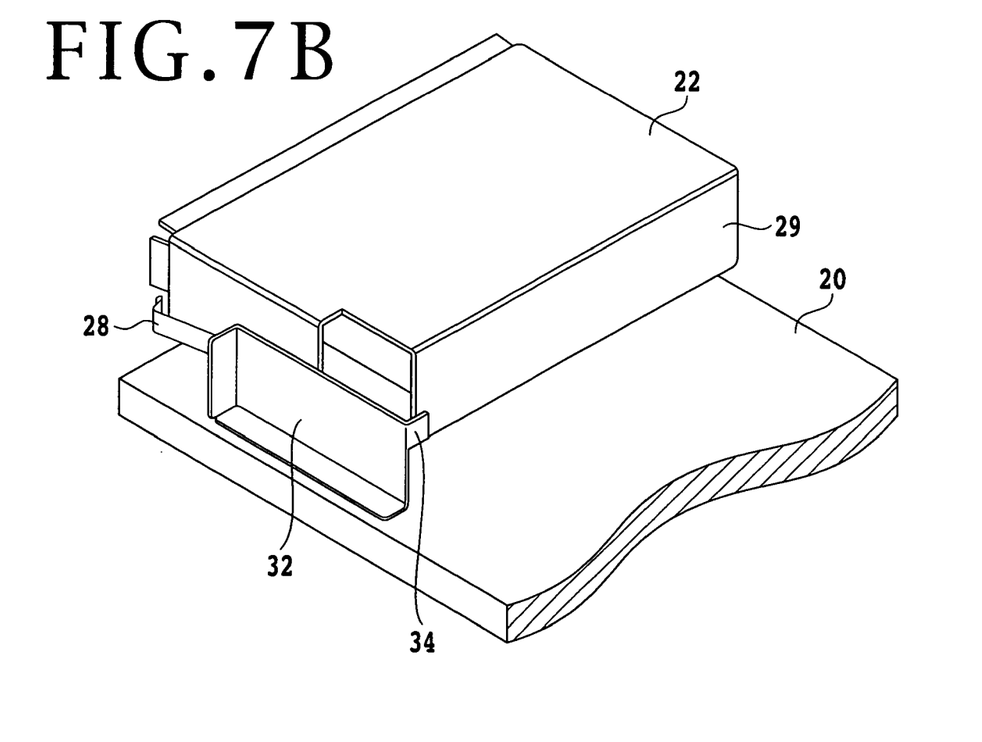
FIG. 7B is another perspective view of the loading mechanism as viewed from the rear side thereof.

Referring to FIG. 6, there is shown a perspective view of the carrier 22. A leaf spring 28 is fixed to one side surface 26 of the carrier 22. The leaf spring 28 is integrally formed at its front end with a hook 28a. The hook 28a of the leaf spring 28 is normally biased in a direction moving away from the carrier 22. Reference numeral 29 denotes a stopper (rear wall) formed by the rear end surface of the carrier 22. FIG. 7A is a perspective view showing a loading mechanism provided in the magnetic tape drive 14 as viewed from the front side thereof, and FIG. 7B is another perspective view of the loading mechanism as viewed from the rear side thereof. The carrier 22 is movable between a cartridge loading position (first position) shown in FIG. 7A and a cartridge mounting position (second position) where the cartridge reel 24 in the magnetic tape cartridge 2 is mounted onto the supply reel motor 31 in the tape drive 14. A carrier driving mechanism for moving the carrier 22 between the cartridge loading position and the cartridge mounting position is not shown in FIGS. 7A and 7B.

The loading mechanism in the magnetic tape drive 14 according to the present invention is characterized in that the carrier 22 and the shutter opening mechanism 32 are configured by separate components. The shutter opening mechanism 32 is fixed to the base 20. The shutter opening mechanism 32 is formed from a plate member, and has one end (rear end) formed with an engaging portion 34 for engaging the shutter 6 of the cartridge 2 to open the shutter 6. The other end (front end) of the shutter opening mechanism 32 opposite to the engaging portion 34 is formed with a pressing portion (edge portion) 32a for pressing the leaf spring 28 to elastically deform the leaf spring 28.

Figure 8A:
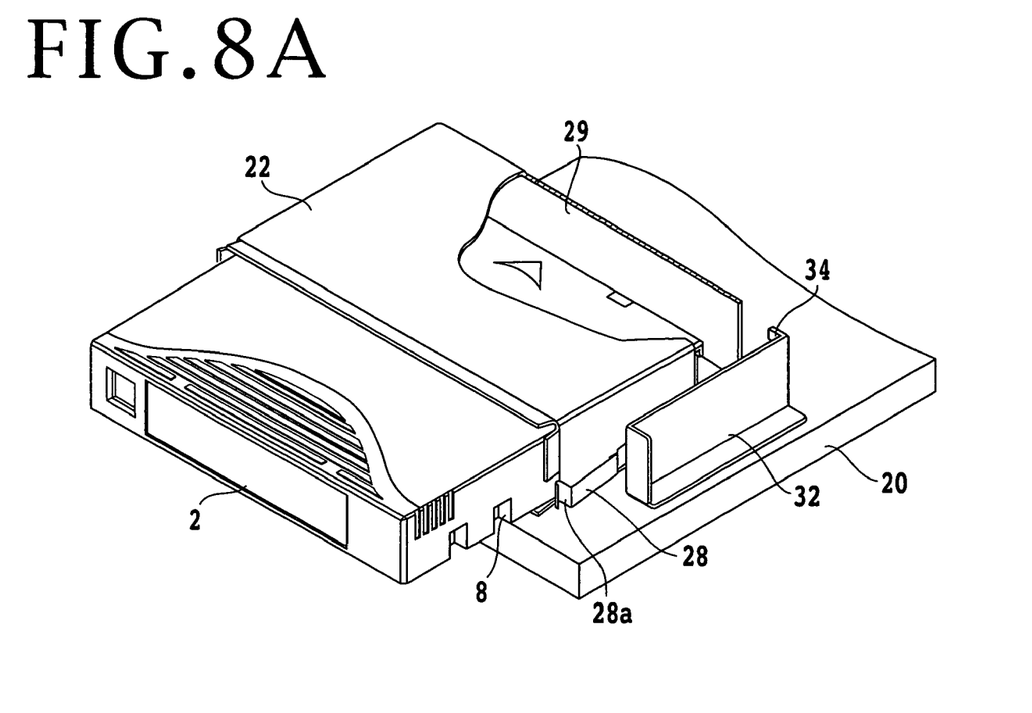
FIG. 8A is a perspective view showing a condition where the cartridge starts to be inserted into the carrier.
Figure 8B:
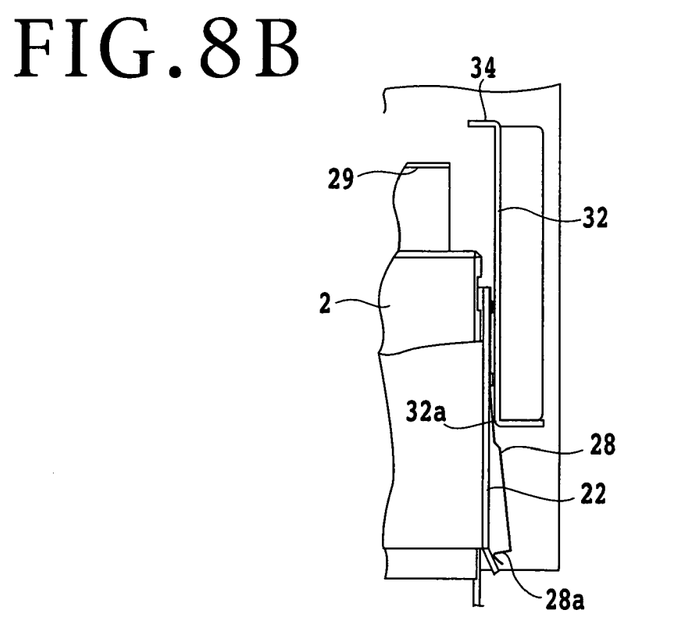
FIG. 8B is a plan view of a part of FIG. 8A.
Figure 9A:
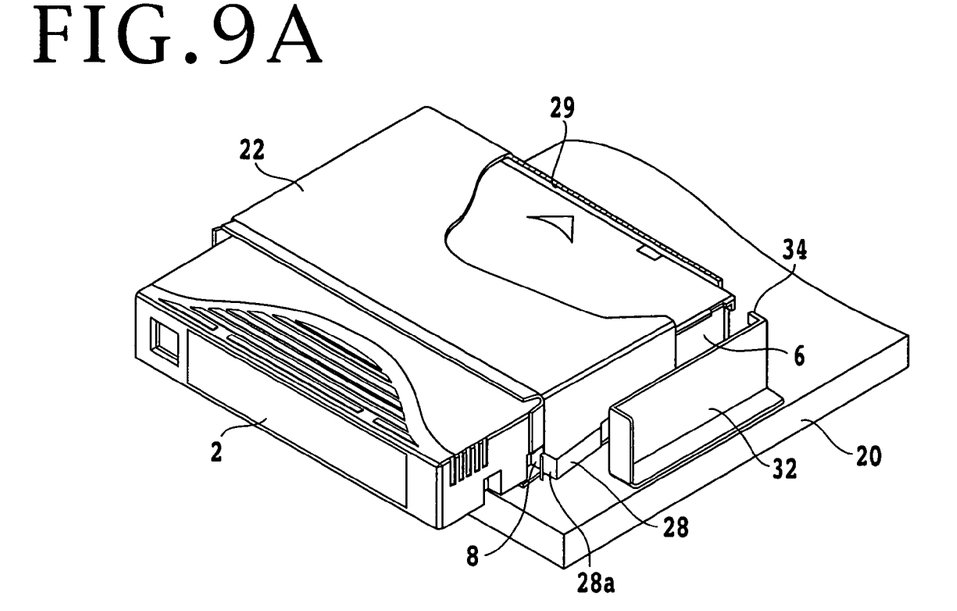
FIG. 9A is a perspective view showing a condition where the cartridge is fully inserted into the carrier.
Figure 9B:
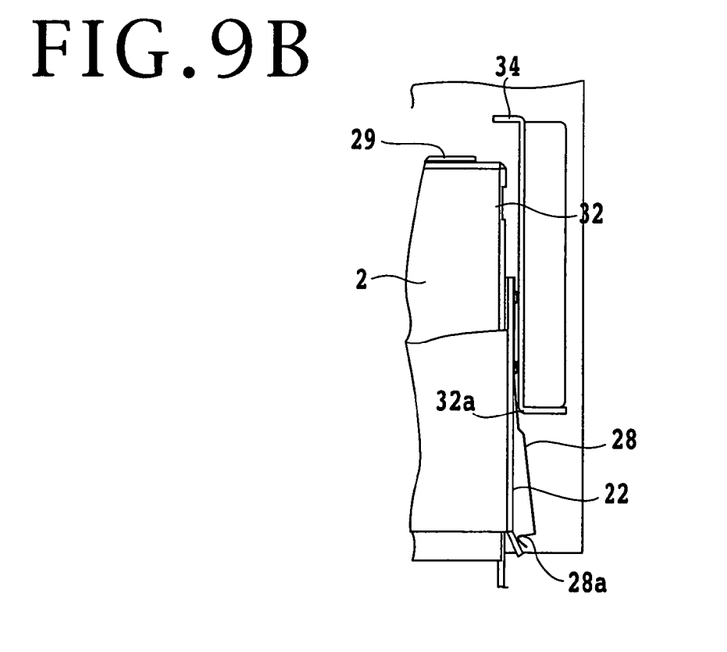
FIG. 9B is a plan view of a part of FIG. 9A.

The operation of the loading mechanism according to this preferred embodiment will now be described with reference to FIGS. 8A to 14B. As shown in FIG. 8A, the cartridge 2 is inserted (loaded) into the carrier 22 by an operator or a handling robot in a library unit. During the insertion of the cartridge 2 into the carrier 22, the cartridge 2 does not come into contact with the hook 28a and the shutter opening mechanism 32 at all. When the cartridge 2 is further inserted into the carrier 22, the cartridge 2 comes into abutment against the stopper 29 of the carrier 22 as shown in FIG. 9A. At this time, the loading operation of the cartridge 2 into the carrier 22 by the operator or the handling robot in the library unit is completed without opening the shutter 6. Further, the hook 28a has not yet been engaged with the notch 8 of the cartridge 2 at this time.

Figure 10A:
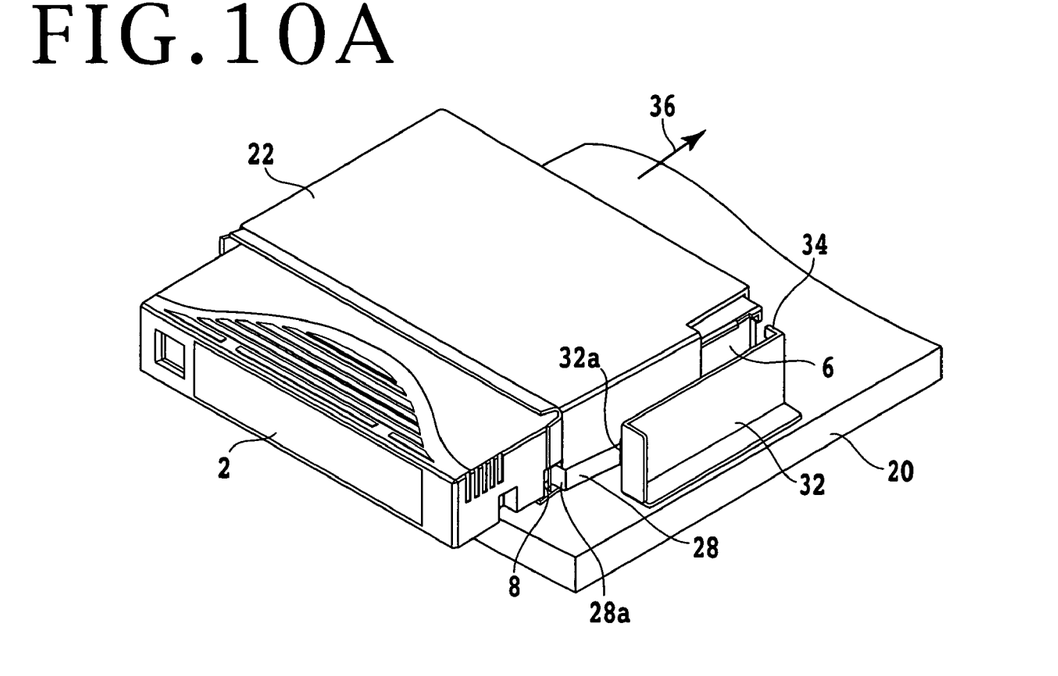
FIG. 10A is a perspective view showing a condition where the carrier starts to be moved to a cartridge mounting position.
Figure 10B:
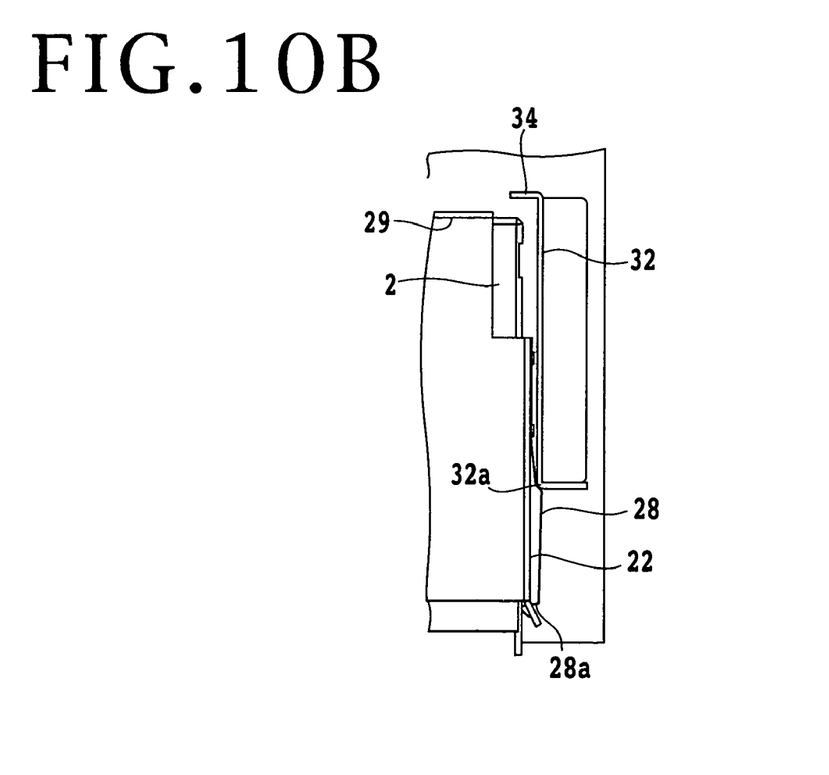
FIG. 10B is a plan view of a part of FIG. 10A.

When the completion of this loading operation of the cartridge 2 into the carrier 22 is detected by a sensor such as a photointerrupter, the carrier 22 starts to be moved in a direction shown by arrow 36 in FIG. 10A by a driving mechanism (not shown), so as to mount the cartridge 2 onto the reel motor 31. Immediately after starting the movement of the carrier 22, the sliding surface of the leaf spring 28 is pressed by the pressing portion 32a of the shutter opening mechanism 32, so that the leaf spring 28 is elastically deformed by the pressing portion 32a to make the hook 28a gradually approach the carrier 22 as shown in FIG. 10B. At this time, the shutter 6 has not yet come into contact with the engaging portion 34 of the shutter opening mechanism 32.

Figure 11A:
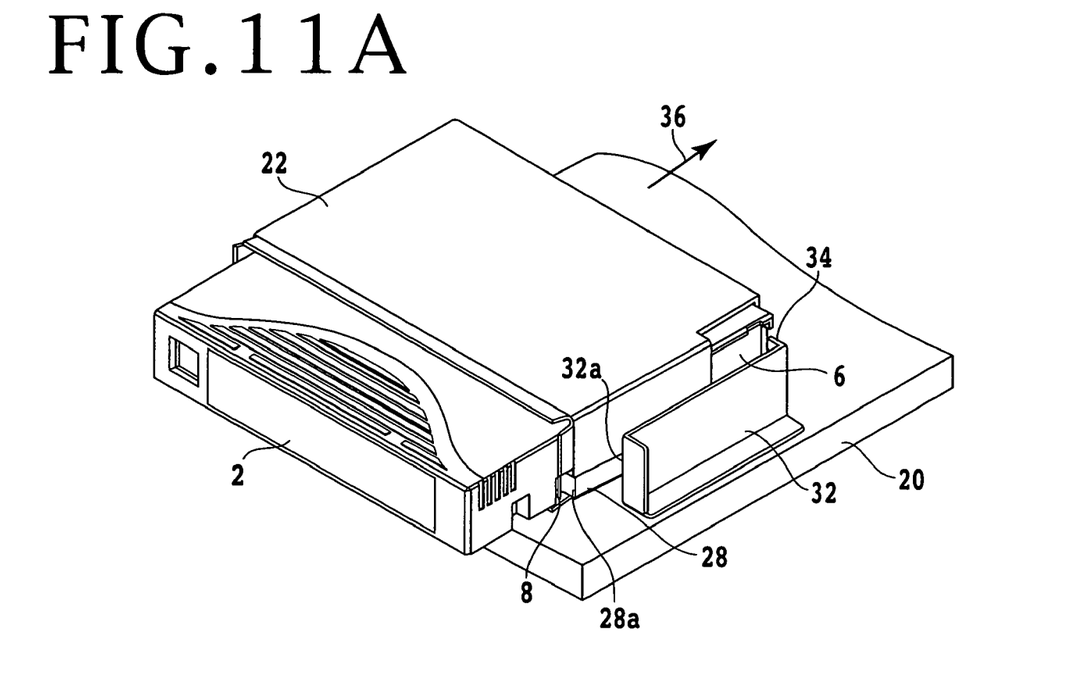
FIG. 11A is a perspective view showing a condition where a hook has just been engaged with a notch of the cartridge.
Figure 11B:
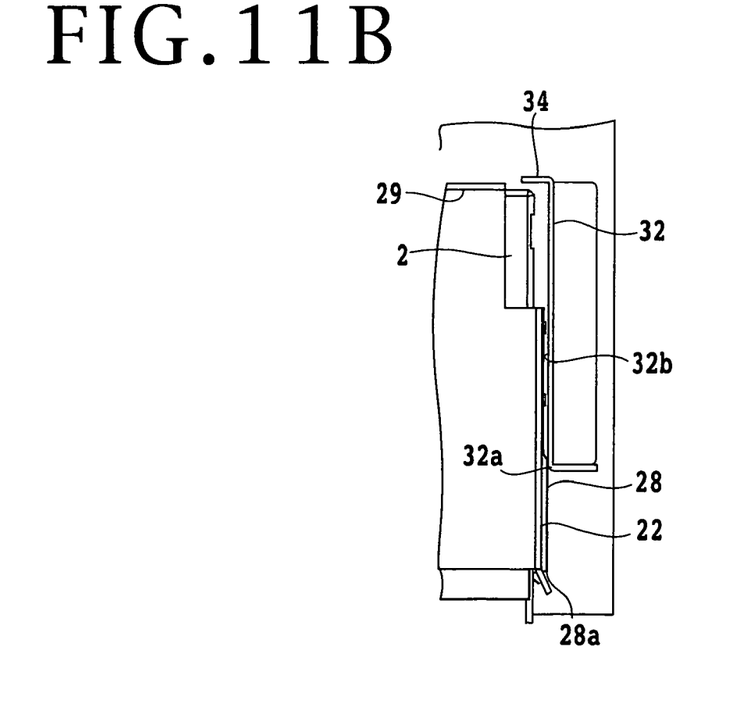
FIG. 11B is a plan view of a part of FIG. 11A.
Figure 12A:
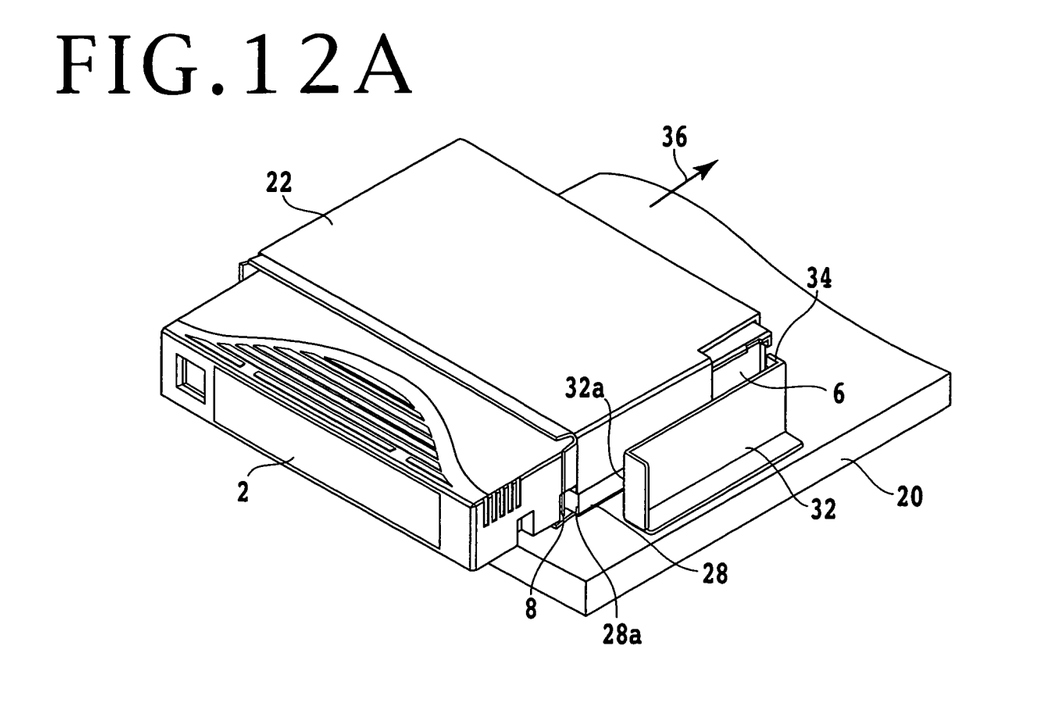
FIG. 12A is a perspective view showing a condition where a shutter of the cartridge has just been engaged with a shutter opening mechanism.
Figure 12B:
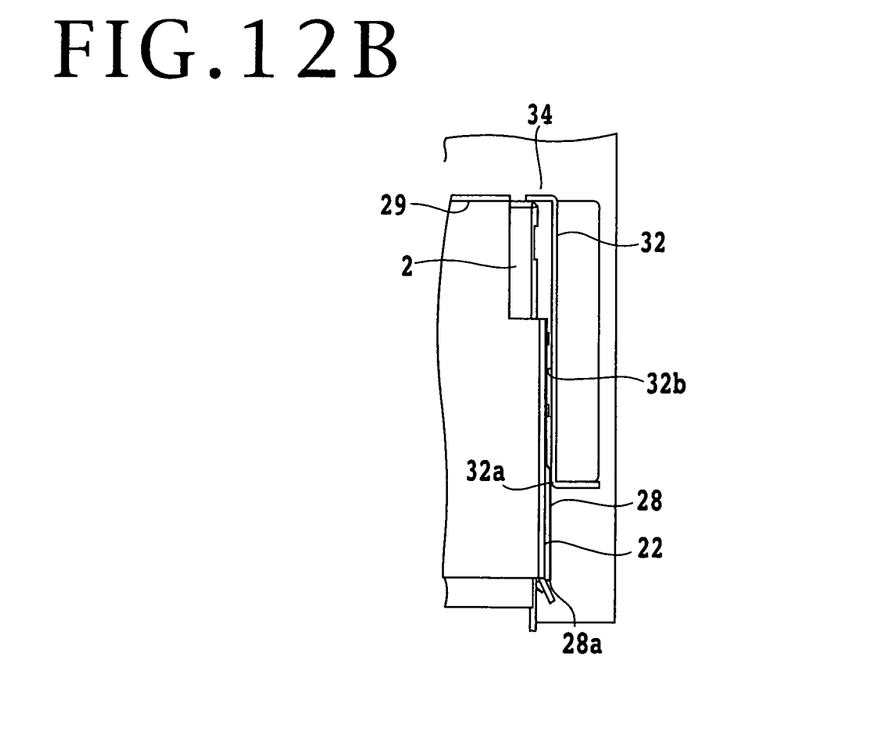
FIG. 12B is a plan view of a part of FIG. 12A.

When the carrier 22 is further moved in the direction of the arrow 36, the sliding surface of the leaf spring 28 starts to slide on a plane portion 32b of the shutter opening mechanism 32 as shown in FIGS. 11A and 11B. At this time, the hook 28a of the leaf spring 28 is fully engaged with the notch 8 of the cartridge 2, and the shutter 6 has not yet come into contact with the engaging portion 34 of the shutter opening mechanism 32. When the carrier 22 is further moved in the direction of the arrow 36, the shutter 6 of the cartridge 2 comes into contact with the engaging portion 34 of the shutter opening mechanism 32 as shown in FIGS. 12A and 12B.

Figure 13A:
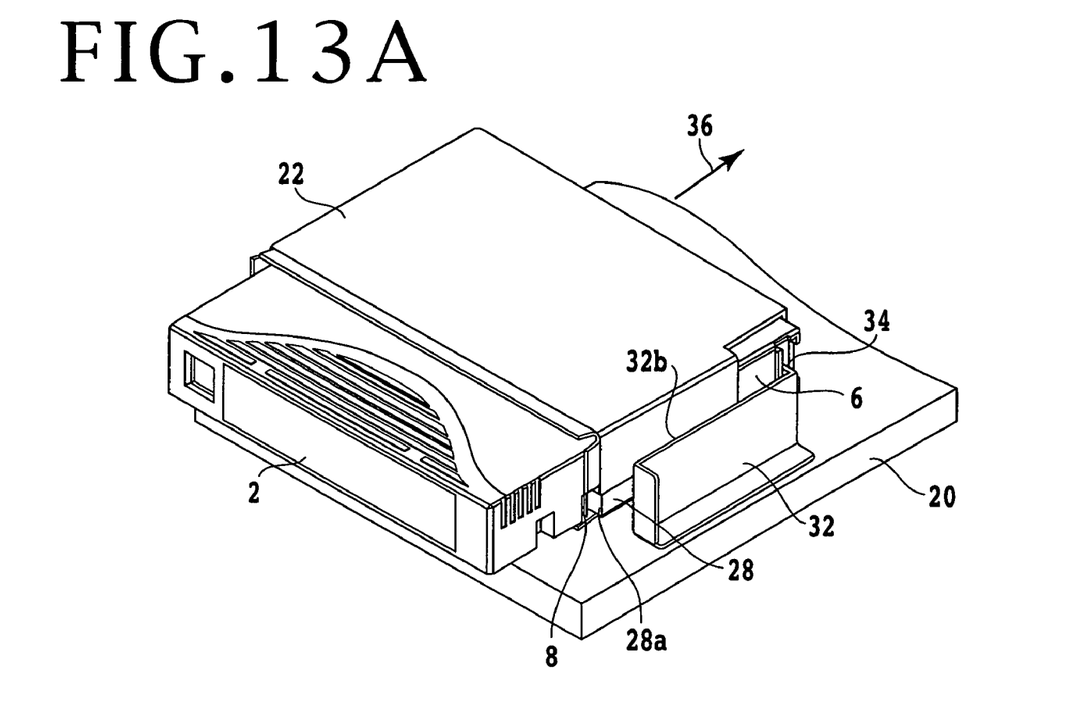
FIG. 13A is a perspective view showing a condition where the shutter is opened by a given amount.
Figure 13B:
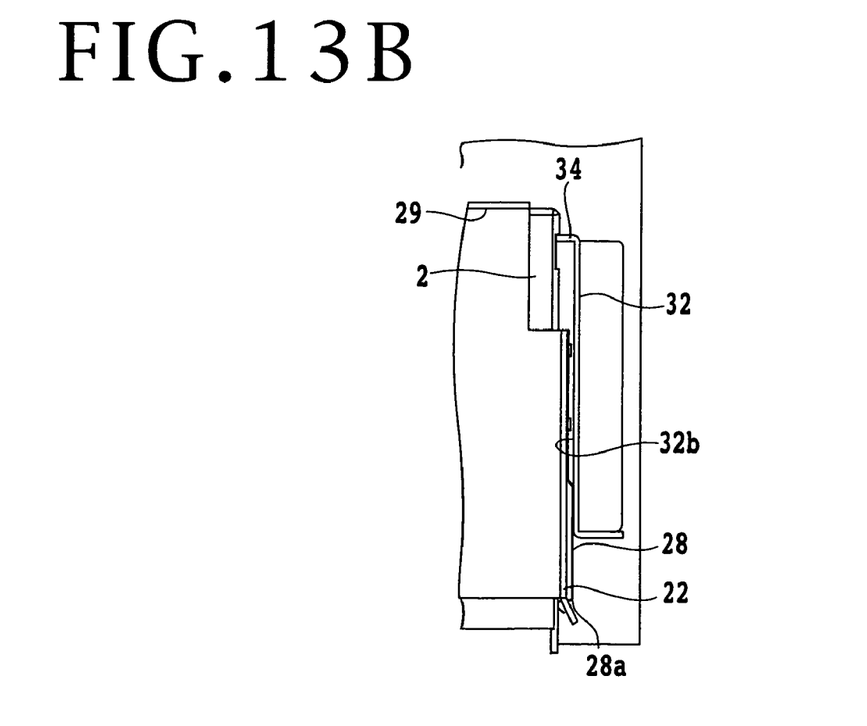
FIG. 13B is a plan view of a part of FIG. 13A.
Figure 14A:
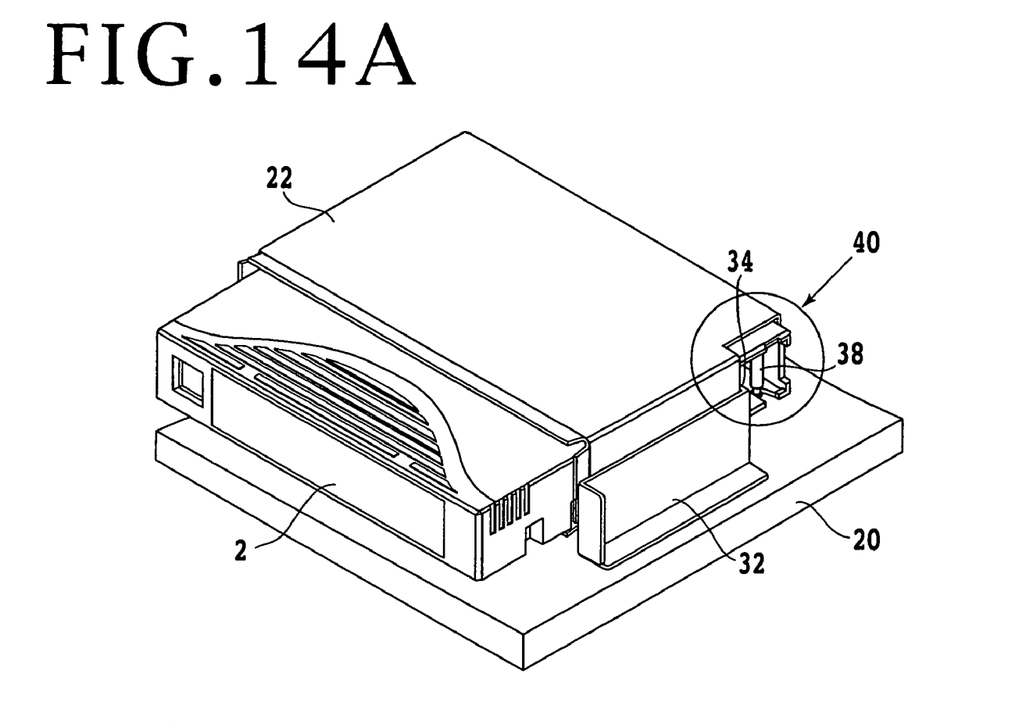
FIG. 14A is a perspective view showing a condition where the shutter is fully opened.
Figure 14B:
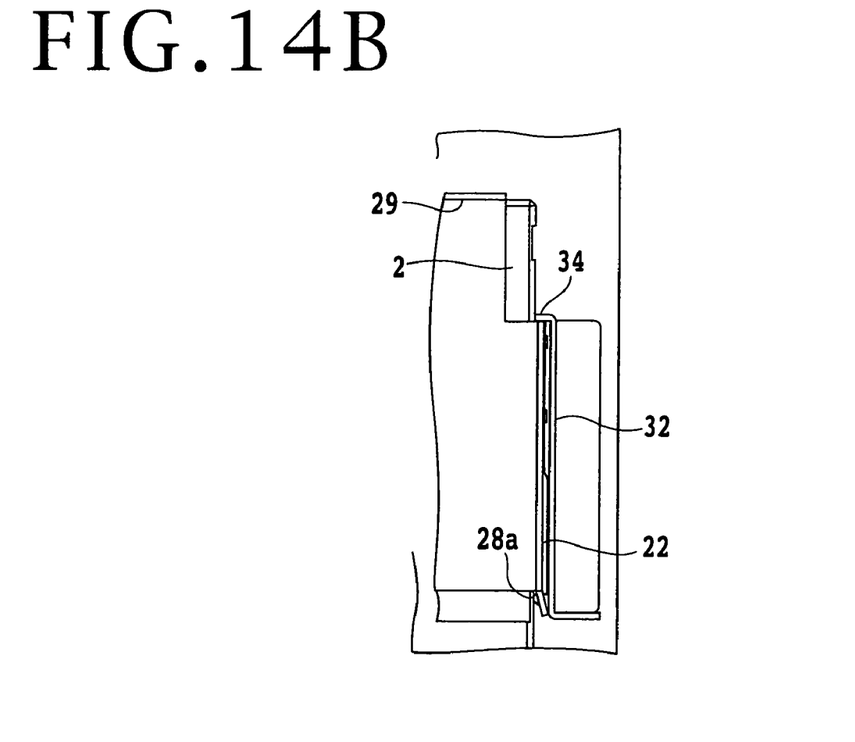
FIG. 14B is a plan view of a part of FIG. 14A.
Figure 15:
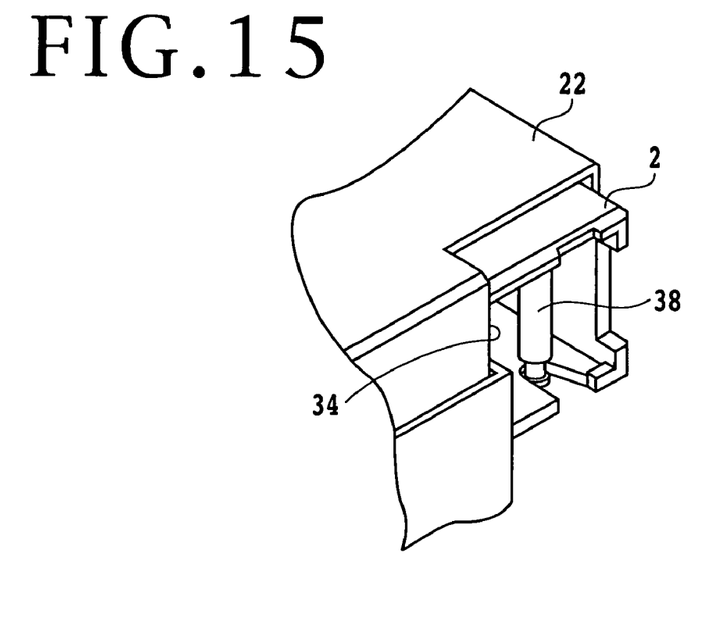
FIG. 15 is an enlarged view of an encircled portion 40 shown in FIG. 14A.

The movement of the carrier 22 in the direction of the arrow 36 continues as shown in FIG. 13A to open the shutter 6 by means of the engaging portion 34 of the shutter opening mechanism 32. Since the shutter 6 is normally biased in its closing direction, the reaction force of the shutter 6 starts to act on the engaging portion 34, so that the cartridge 2 receives a force in a direction of ejection from the carrier 22. At this time, however, the hook 28a is engaged with the notch 8, and the leaf spring 28 is resiliently urged toward the carrier 22 by the plane portion 32b of the shutter opening mechanism 32. Accordingly, although the cartridge 2 receives a force in the direction of ejection from the carrier 22, the hook 28a is not disengaged from the notch 8, thereby reliably holding the cartridge 2 in the carrier 22. After the carrier 22 is further moved to fully open the shutter 6 as shown in FIG. 14A, the carrier 22 is moved downward by a predetermined distance so as to mount the cartridge 2 onto the reel motor 31. As shown in FIG. 15, a leader pin 38 connected to the magnetic tape 25 is exposed in the full open condition of the shutter 6.

The operation of ejecting the cartridge 2 from the carrier 22 will now be described. The carrier 22 holding the cartridge 2 starts to be moved from the condition shown in FIG. 14A to the condition shown in FIG. 13A in a direction opposite to the direction of the arrow 36. Accordingly, the cartridge 2 held in the carrier 22 is also moved with the carrier 22 in this ejecting direction. Since the shutter opening mechanism 32 is fixed to the base 20, the shutter 6 starts to be closed by the biasing force applied thereto in the cartridge 2 as shown in FIG. 13A. At this time, the sliding surface of the leaf spring 28 slides on the plane portion 32b of the shutter opening mechanism 32, so that the hook 28a still remains engaged with the notch 8 of the cartridge 2. When the carrier 22 is further moved in the ejecting direction opposite to the direction of the arrow 36, the cartridge 2 is also moved with the carrier 22 in the ejecting direction, and the shutter 6 is fully closed as shown in FIG. 12A. At this time, the sliding surface of the leaf spring 28 still slides on the plane portion 32b of the shutter opening mechanism 32, so that the hook 28a still remains engaged with the notch 8 of the cartridge 2.

When the carrier 22 is further moved in the ejecting direction, the sliding surface of the leaf spring 28 comes out of the contact range where it is urged by the plane portion (sliding surface) 32b of the shutter opening mechanism 32. Since the hook 28a is normally biased away from the carrier 22, the hook 28a is disengaged from the notch 8 of the cartridge 2 as shown in FIGS. 10A and 10B. Thereafter, the carrier 22 is further moved to the cartridge loading/ejecting position shown in FIGS. 9A and 9B. Thus, the movement of the carrier 22 is completed. At this cartridge loading/ejecting position, the cartridge 2 is removed from the carrier 22 by the operator or the handling robot in the library unit. Since the hook 28a has already been disengaged from the notch 8 of the cartridge 2 at this time, the cartridge 2 does not come into contact with the hook 28a during this removal operation.

Figure 16:
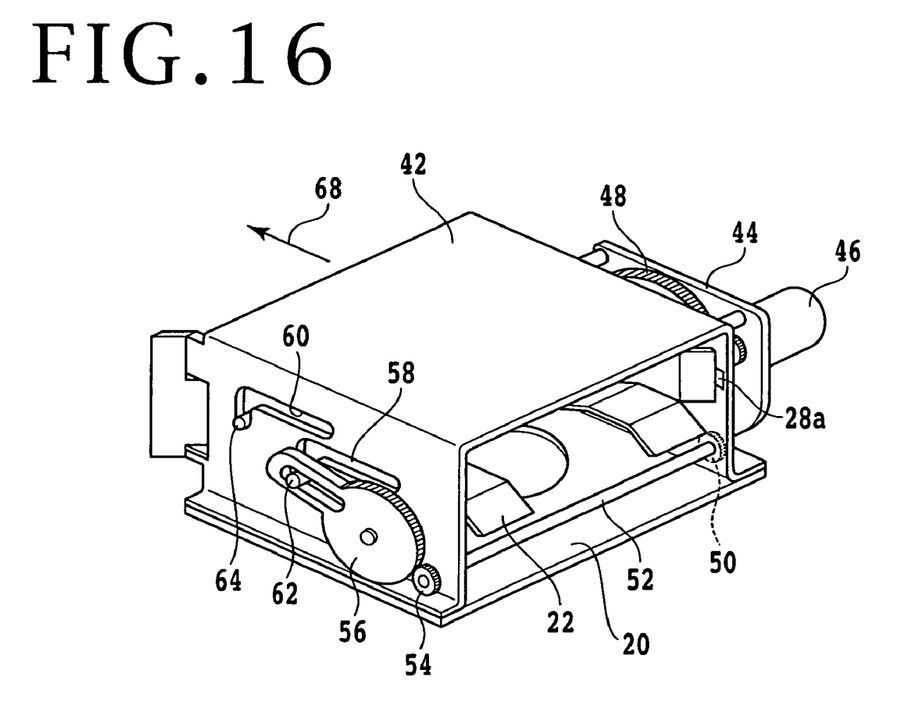
FIG. 16 is a schematic perspective view of a loading mechanism for a magnetic tape drive including a carrier driving mechanism.

Referring next to FIG. 16, there is shown a preferred embodiment of the loading mechanism including the carrier driving mechanism. A casing 42 is fixed to the base 20, and the carrier 22 is movably accommodated in the casing 42. A bracket 44 is fixed to the casing 42, and a carrier driving motor 46 is mounted on the bracket 44. An output from the carrier driving motor 46 is transmitted through a gear train 48 to a pinion gear 50. The pinion gear 50 is connected through a shaft 52 to another pinion gear 54 opposite to the pinion gear 50. These pinion gears 50 and 54 are in mesh with a pair of carrier driving arms 56 (one of which being shown) pivotably mounted to the opposite side surfaces of the casing 42, respectively. Each of the opposite side surfaces of the casing 42 is formed with a pair of L-shaped openings 58 and 60. Pins 62 and 64 fixed to the carrier 22 are inserted through these openings 58 and 60, respectively. The pin 62 is operatively engaged with each carrier driving arm 56.

In operation, a rotational drive force generated from the carrier driving motor 46 is transmitted through the gear train 48 to the pinion gear 50 and further transmitted through the shaft 52 to the pinion gear 54. When the carrier driving arms 56 are rotated counterclockwise as viewed in FIG. 16 by the pinion gears 50 and 54, the carrier 22 is moved in a direction shown by an arrow 68. Conversely, when the motor 46 is reversely driven to clockwise rotate the carrier driving arms 56 as viewed in FIG. 16, the carrier 22 is moved in a direction opposite to the direction of the arrow 68. The carrier driving mechanism shown in FIG. 16 is merely illustrative, and the carrier driving mechanism according to the present invention is not limited to the preferred embodiment shown in FIG. 16.

According to the present invention, the following effects can be exhibited.

(1) The shutter of the cartridge is not opened during the cartridge loading operation by the operator (or the handling robot in the library unit). Accordingly, the cartridge can be smoothly loaded into the carrier without the influence of the reaction force of the shutter.

(2) The cartridge does not come into contact with the hook during the cartridge loading operation by the operator. Accordingly, the cartridge can be smoothly loaded into the carrier without the influence of the reaction force of the hook.

(3) Also in ejecting the cartridge from the carrier by the operator, the cartridge does not come into contact with the hook. Accordingly, the cartridge can be smoothly ejected from the carrier without the influence of the reaction force of the hook.

(4) Since the cartridge does not come into sliding contact with the hook, the surface condition of the cartridge is not deteriorated and no wear particles are generated. Accordingly, the interference between the hook and the cartridge during the cartridge loading/ejecting operation by the operator can be prevented, so that the cartridge loading/ejecting operation by the operator can be always normally performed.

(5) The hook is brought into engagement with the notch of the cartridge before the shutter of the cartridge comes into contact with the shutter opening mechanism. Accordingly, although the reaction force of the shutter acts on the cartridge in opening the shutter, the cartridge can be reliably held in the carrier, so that the cartridge carrying operation by the carrier in loading the cartridge can be stably performed.

(6) In the cartridge ejecting operation, the hook is disengaged from the notch of the cartridge after the shutter of the cartridge is separated from the shutter opening mechanism (after the shutter is fully closed). Accordingly, there is no possibility that the reaction force of the shutter acts on the cartridge after the hook is disengaged from the notch. As a result, the cartridge can be reliably held in the carrier during the ejecting operation by the carrier, so that the cartridge carrying operation by the carrier in ejecting the cartridge can be stably performed.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A cartridge loading mechanism for loading a cartridge having a lid and an engaged portion, comprising:
    a base;
    a carrier movable with respect to said base in a direction parallel to said base between a first position where a cartridge is inserted into said carrier and a second position where said cartridge is mounted onto a reel motor;
    a lid opening mechanism fixed to said base and having a first engaging portion adapted to engage with said lid of said cartridge to open said lid;
    a leaf spring mounted on said carrier and having a second engaging portion adapted to engage with said engaged portion of said cartridge, said leaf spring arranged to fix said cartridge to said carrier during movement of said carrier; and
    a driving mechanism for moving said carrier between said first position and said second position,
    wherein said leaf spring and said lid opening mechanism are arranged such that, after said second engaging portion of said leaf spring comes into engagement with said engaged portion of said cartridge at a third position during the movement of said carrier from said first position to said second position, said first engaging portion of said lid opening mechanism starts to engage said lid of said cartridge.

2. A cartridge loading mechanism according to claim 1, wherein said lid is opened by the movement of said carrier toward said second position in the condition where said first opening portion of said lid opening mechanism is engaged with said lid.

3. A cartridge loading mechanism according to claim 1, wherein in a cartridge ejecting operation where said carrier is moved from said second position to said first position, said second engaging portion of said leaf spring is disengaged from said engaged portion of said cartridge after said first engaging portion of said lid opening mechanism is completely separated from said lid.

4. A cartridge loading mechanism according to claim 1, wherein said lid opening mechanism is formed from a plate member fixed to said base, and said second engaging portion of said leaf spring is biased in a direction moving away from said carrier.

5. A cartridge loading mechanism according to claim 4, wherein said plate member has a pressing portion for pressing said leaf spring at a position opposite to said first engaging portion, whereby when said carrier is moved from said first position toward said second position, said leaf spring is pressed by said pressing portion in a direction moving toward said carrier to bring said second engaging portion of said leaf spring into resilient engagement with said engaged portion of said cartridge.

* * * * *